United States Patent [19]

Bernard

[11] 4,268,222

[45] May 19, 1981

[54] EQUIPMENT FOR FOLDING THE BLADES OF A MAIN HELICOPTER ROTOR

[75] Inventor: Louis A. Bernard, Saint-Victoret, France

[73] Assignee: Societe Nationale Industrielle Aerospatiale, France

[21] Appl. No.: 29,510

[22] Filed: Apr. 12, 1979

[30] Foreign Application Priority Data

Apr. 17, 1978 [FR] France .............................. 78 11177

[51] Int. Cl.³ ............................................. B64C 11/28
[52] U.S. Cl. ........................................ 416/1; 416/143
[58] Field of Search .................. 416/143, 142, 134 A, 416/1

[56] References Cited

U.S. PATENT DOCUMENTS

| | | |
|---|---|---|
| 2,549,886 | 4/1951 | Buivid . |
| 3,097,701 | 7/1963 | Buivid ............................... 416/143 |
| 3,101,785 | 8/1963 | Leoni . |
| 3,135,333 | 6/1964 | Cruz et al. . |
| 3,967,918 | 7/1976 | Mouille et al. . |
| 4,012,169 | 3/1977 | Mouille et al. . |

FOREIGN PATENT DOCUMENTS

| | | |
|---|---|---|
| 1376282 | 9/1964 | France . |
| 2038279 | 1/1971 | France . |
| 2158542 | 6/1973 | France . |
| 582802 | 11/1946 | United Kingdom ................ 416/142 |

Primary Examiner—John M. Jillions
Attorney, Agent, or Firm—Karl W. Flocks

[57] ABSTRACT

The invention relates to equipment which makes it possible to fold the blades of a rotor, in particular of the type comprising a star-shaped hub with arms flexible in the direction perpendicular to the plane of the star-shaped hub.

This equipment comprises a housing which is detachably mounted on the rigid central part of the rotor hub. This housing carries elongate supports at the side. The free end of each support is detachably joined to the upper part of the folding shaft of the corresponding blade. This folding shaft can consist of a spindle replacing a link shaft between the foot of the blade and the corresponding arm of the hub.

15 Claims, 5 Drawing Figures

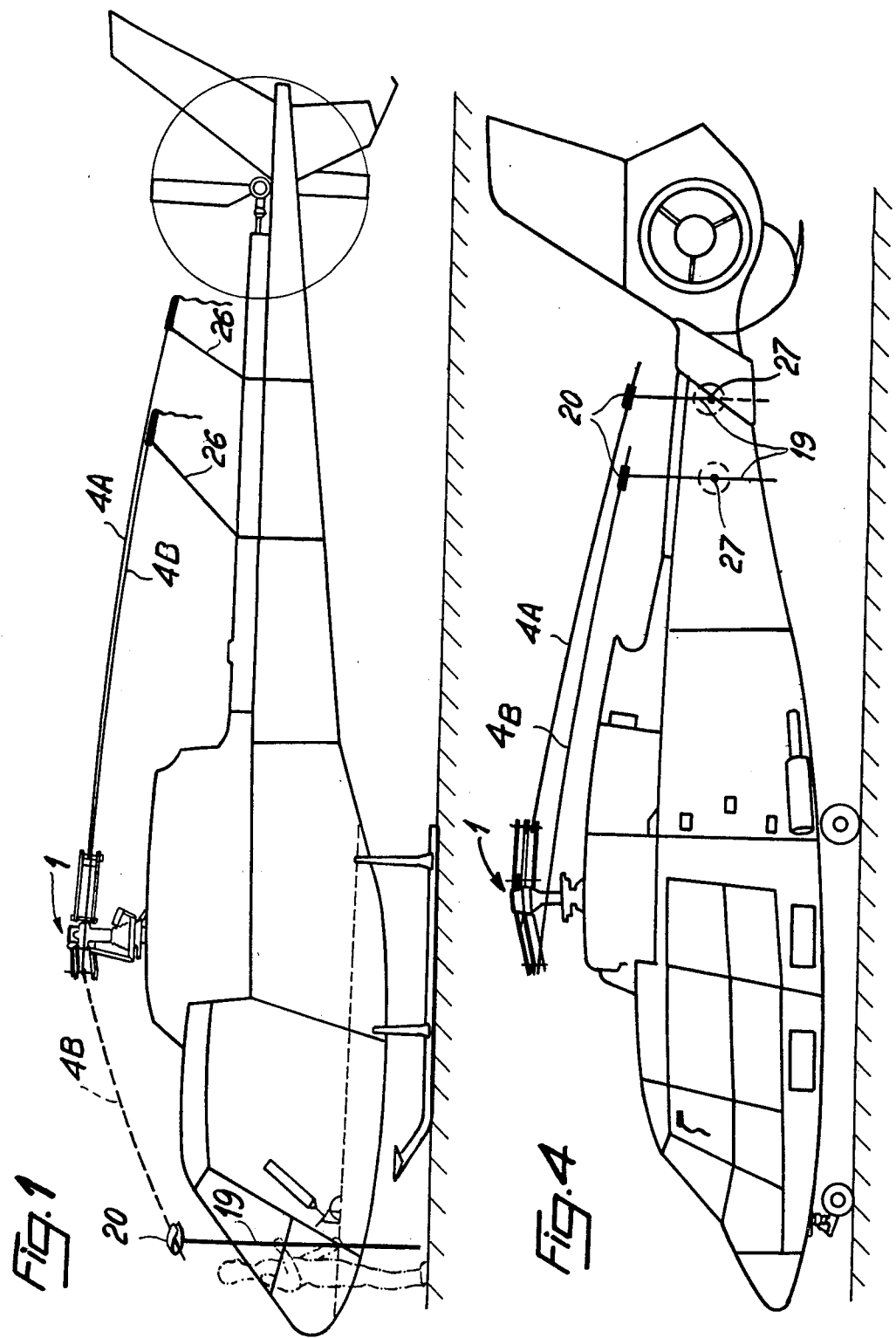

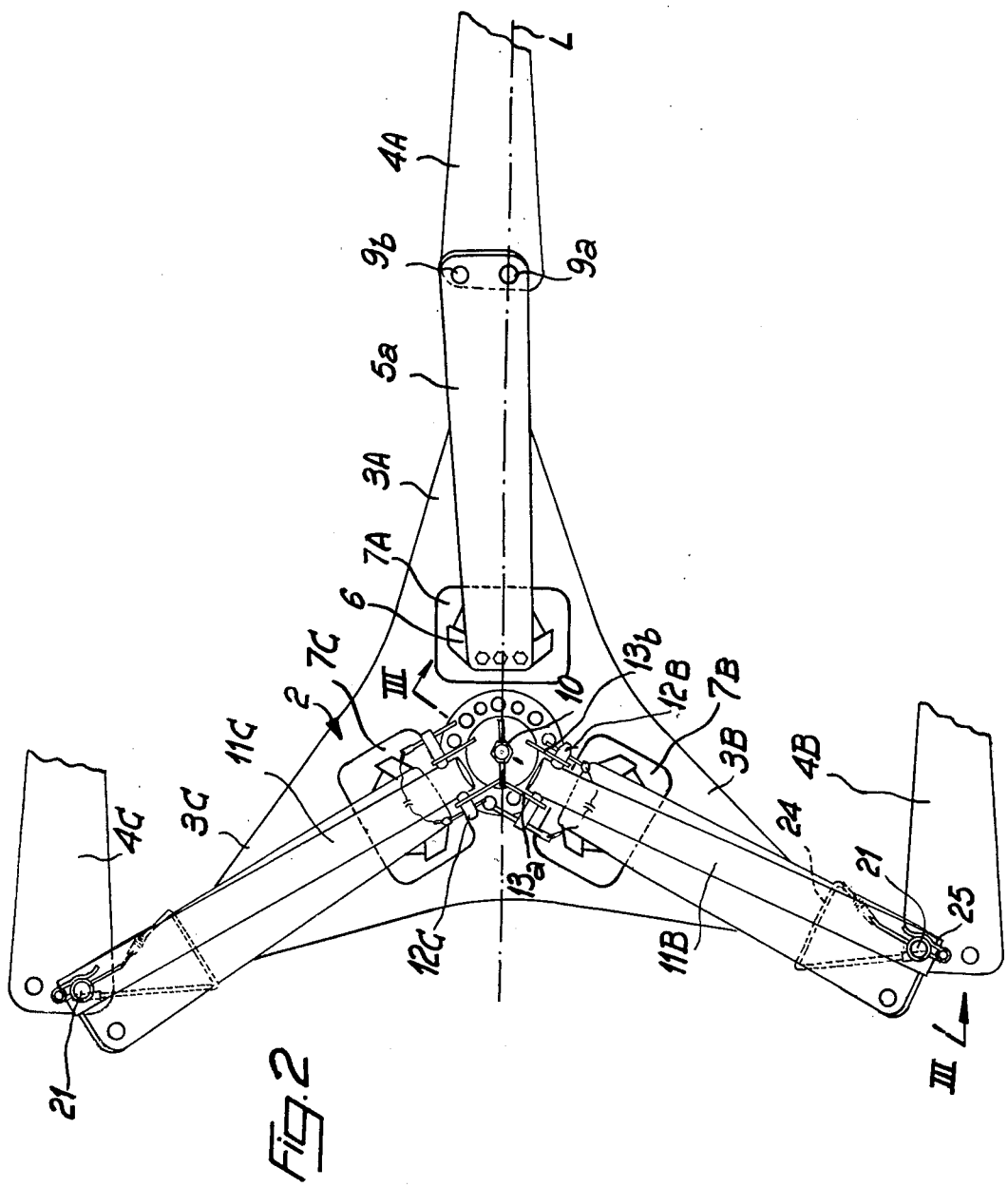

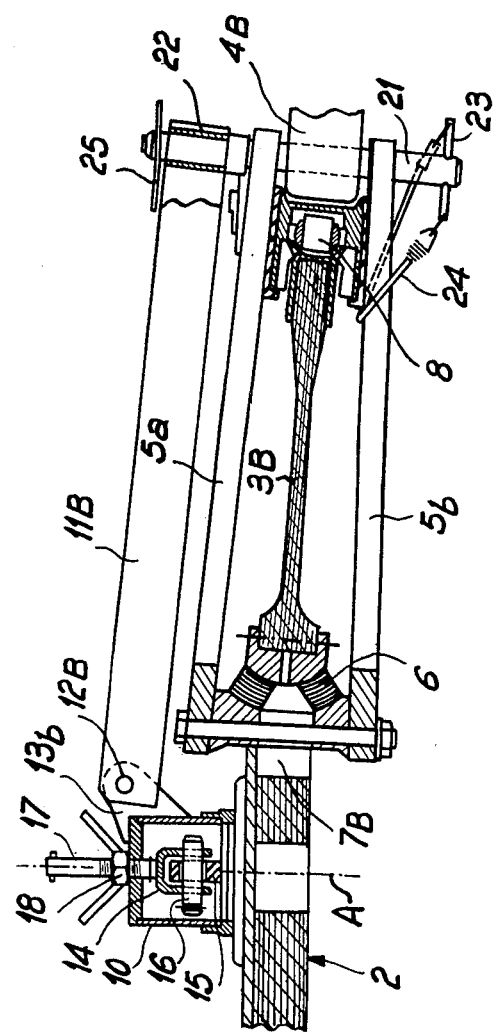

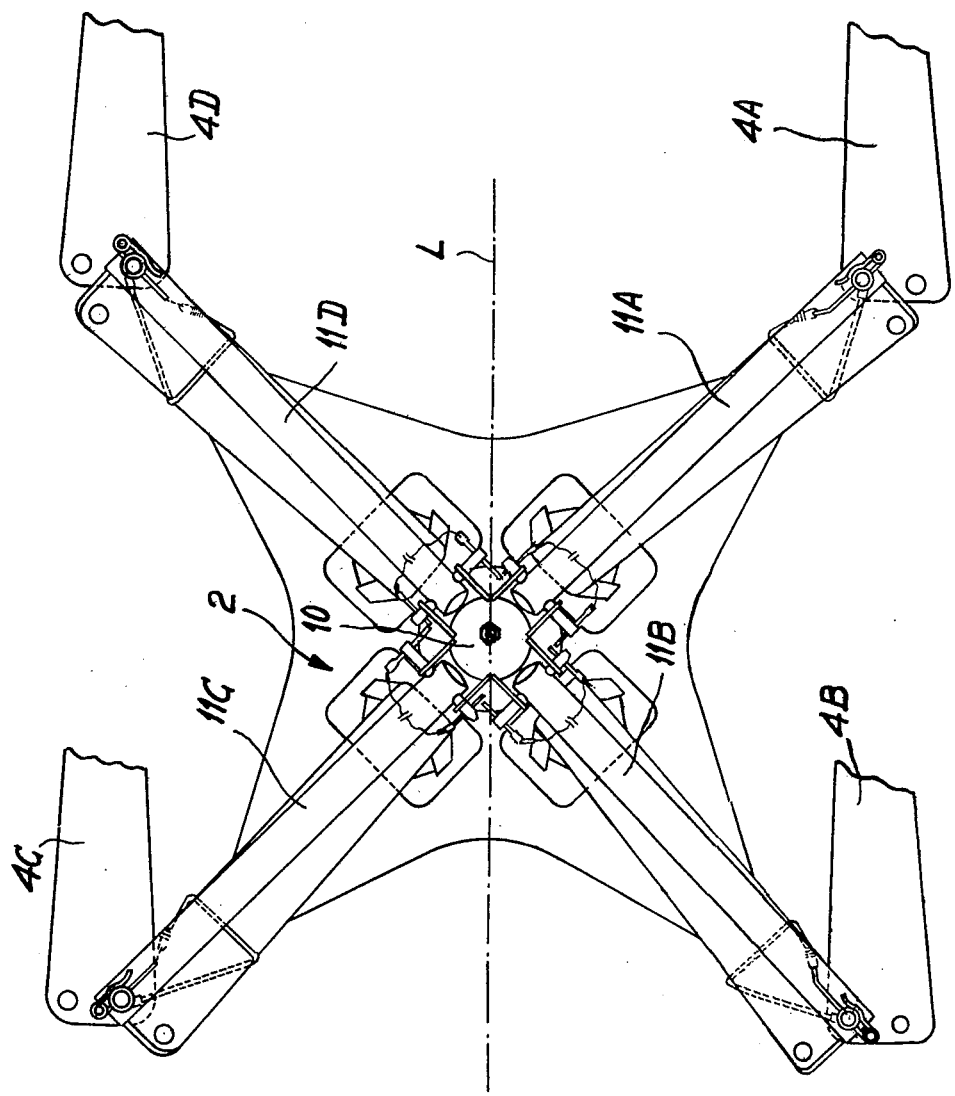

EQUIPMENT FOR FOLDING THE BLADES OF A MAIN HELICOPTER ROTOR

The present invention relates to equipment which makes it possible to fold the blades of a main helicopter rotor.

For parking helicopters, it is frequently desirable to be able to fold the blades of their main rotor; this is the case, in particular, on helicopter carriers. It is always desirable that this folding of the blades can take place rapidly, but also without any risk of failure either of the device which ensures the folding or of those which keep the blades in the folded position.

Devices for the automatic folding, that is to say without manual intervention, of the blades of a main helicopter rotor are already known, in particular from published French Patent Application Ser. No. 72.39086 issued as French Pat. No. 2,158,542; various embodiments, namely hydraulic, pneumatic, electrical or combined embodiments, of automatic folding devices of this kind are known; however, their complexity and their weight prevent them from being mounted on light and inexpensive helicopters. Furthermore, by the very fact that they are complex, these automatic folding devices are not proof against failures.

Devices permitting the manual folding of the blades of a main helicopter rotor are also known; these known devices are obviously simpler and more reliable than the automatic devices; they make is possible to fold each blade either about its drag hinge, if it is provided with such a hinge, or about one of the link shafts between the blade and the rotor hub.

Various devices of this kind have hitherto been developed for folding the blades of main rotors with an entirely metal hub, each blade of which necessarily comprises, in addition to its drag hinge, a flapping hinge and a hinge for controlling the angle of incidence. These rotors with a metal hub have therefore presented the problem of locking the flapping hinge and the hinge for controlling the angle of incidence during the folding in order to prevent the movements of each blade about its hinges from possibly interfering with the correct folding of the blade, as a result of which the blade could be damaged. Various devices have been described for solving this problem:

According to U.S. Pat. No. 2,549,886, each blade pivots about one of its two link shafts, releasing a spindle, which is moved by means of springs, from a flange integral with the hinge for controlling the angle of incidence. U.S. Pat. No. 3,101,785 provides for a blade attachment sleeve which is connected to a support plate, integral with the pitch change mechanism, via locking means which, when they are released, free the said sleeve from the said pitch change mechanism and enable it to rotate, making it possible for the blade to be folded. According to U.S. Pat. No. 3,135,333, each blade is joined to the hub by means of a spindle and a conical sleeve, which are held by a locking key and make the folding and unfolding of the blade very reliable. According to French Pat. No. 1,376,282, the rotor blades are joined to the rotor hub by means of a single drag hinge shaft, about which the blade pivots while it is being folded, and also by means of a damping element which must be uncoupled to permit folding, and of which the point of attachment to the hub comprises a device for coupling and locking by means of flanges; a male rotary element is engaged in the flanges so as to cooperate with cams and with a flexible locking member; a pin and a locking handle are provided for. Finally, published French Patent Application Ser. No. 2,038,279 provides for using a secondary pin for fixing a blade to the rotor hub for the purpose of locking the control lever in the sealing-bush holder which is integral with the said hub.

However, these prior art devices cannot be used for folding the blades of a main helicopter rotor comprising a star shaped hub provided with arms which are flattened in the plane of the star and flexible perpendicular to this plane, and at the end of each of which a blade root is fixed, because the flexible arms of a hub of this kind participate at least in the flapping movements of the blades, with the result that the corresponding hinge shaft is not held in a fixed position. Star-shaped hubs of this kind, for a main helicopter rotor, are described, in particular, in U.S. Pat. Nos. 3,967,918 and 4,012,169, filed on May 10, 1974 and Mar. 22, 1976 respectively.

The helicopter rotors described in these patents also comprise spherical abutments of composite structure, which have several degrees of freedom, and this would make it extremely difficult to prevent the flapping and angle of incidence movements of the blades while they are being folded.

A first object of the invention is to produce an equipment which makes it possible to fold the blades of a main helicopter rotor, in particular, but not exclusively, of the type comprising a star-shaped hub provided with arms which are flattened in the plane of the star and flexible perpendicularly to this plane, and to the end of each of which a blade root is joined by means of members comprising at least one shaft which is approximately perpendicular to the plane of the star.

A second object of the invention is to produce an equipment of the type indicated, which essentially comprises a housing which can be fitted over the rigid central part of the hub, and also rigid elongate supports, at most equal in number to the blades, each of these supports being adapted for joining the upper end of the folding shaft of a blade to the housing located on the hub. This folding shaft can consist of one of the link shafts of the said blade or, preferably, of a spindle which has been substituted for this link shaft.

By making it possible to join the blade roots of a main helicopter rotor directly to a housing fitted over the rigid central part of the hub, the equipment according to the present invention can oppose the flapping and angle of incidence movements of the blades, or at least greatly reduce their respective amplitudes, in such a way that these movements are not likely to interfere with the folding movement of each blade, which folding movement can thus be carried out manually under conditions of perfect safety and stability. The equipment according to the present invention also possesses great simplicity, which contributes to its reliability and its low cost. Since it is detachable, it does not constitute a permanent extra load for the rotor. In addition, it can be fitted to the said rotor without it being necessary to modify the latter in any way. Its manual operation is also very simple and does not require skilled labour. The equipment according to the present invention can be produced without difficulty for a rotor comprising any number of blades, regardless of the structure of their hinges and that of the flexible parts of the hub.

The present invention also relates to a process for manually folding the blades of a main helicopter rotor using the equipment defined above.

By way of examples, several embodiments of the equipment according to the present invention have been described below and illustrated schematically in the attached drawing.

FIG. 1 shows, in elevation, a helicopter provided with a three-blade main rotor, the blades of which have been folded by using the equipment according to the present invention.

FIG. 2 is a plan view of the folded three-blade rotor of FIG. 1.

FIG. 3 is a view, in partial section, along the line III—III of FIG. 2.

FIG. 4 is a view, in elevation, of a helicopter provided with a four-blade main rotor, the blades of which have been folded using the equipment according to the present invention.

FIG. 5 is a plan view of the folded four-blade rotor of FIG. 4.

The helicopter illustrated in FIG. 1 is provided with a three-blade rotor 1 which comprises a star-shaped hub 2 (FIGS. 2 and 3) provided with three arms, 3A, 3B and 3C, which are flattened in the plane of the star, as can be seen in the case of the arm 3B in FIG. 3, and which are flexible perpendicularly to this plane. For this purpose, the hub 2 can be made, in particular, of glass fibres coated with thermosetting resin. To the end of each arm, for example the arm 3B, of the hub 2, the root of a blade, for example the blade 4B, is joined by means of link members which, in the embodiment in question, are formed as illustrated in the drawing attached to U.S. Pat. No. 3,967,918 already mentioned above. For each blade, these link members comprise a yoke, of which the branches, 5a and 5b, enclose the flat part of the corresponding arm, 3B, of the hub; a spherical abutment 6, of composite structure, is compressed between, on the one hand, the ends of the branches, 5a and 5b, of the said yoke, and, on the other hand, the outer edge of an opening 7B arranged in the hub 2 at the base of the arm 3B; since each arm, such as 3B, of the hub 2 terminates in a radial cylindrical end, the latter is slidingly engaged in the bore of a swivel joint 8, which is itself mounted between the two branches, 5a and 5b, of the yoke; finally, the root of the corresponding blade, for example the blade 4A (FIG. 2), is fixed between the ends of the two branches, 5a and 5b, of the yoke via two link shafts, 9a and 9b, which are approximately perpendicular to the plane of the hub 2.

The equipment according to the present invention, which is intended to permit the folding of the blades of the rotor 1, described above, essentially comprises a housing 10, which is in the shape of a cylinder in this embodiment and can be fitted over the rigid central part of the hub 2, and also two rigid elongate supports, 11B and 11C, which are smaller in number than the blades; each of these supports, for example 11B, consists, in particular, of a length of metal tube which is suitable for joining the upper end of the folding shaft of a blade, for example the blade 4B, to the housing 10 located on the hub 2. In the embodiment in question, the housing 10, of cylindrical shape, which is located on the central part of the hub 2 so that its axis lies in the extension of the axis, A, of the rotor, is provided, on the side, with articulations, 12B and 12C, for the ends of the rigid elongate supports 11B and 11C; in the embodiment illustrated, these articulations 12B and 12C are formed by pins, passing through coinciding holes, which are arranged in two parallel lugs, 13a and 13b, fixed to the side wall of the housing 10, and in the corresponding end of the elongate support 11B or 11C, so that the axis of each articulation 12B or 12C is approximately perpendicular to the axis A of the rotor.

The equipment according to the present invention, which has now been described, can be used in the following manner for permitting the manual folding of the blades 4B and 4C, which have not stopped above the longitudinal axis L of the helicopter.

First of all, the housing 10, provided with its two elongate supports 11B and 11C, is fitted over the rigid central part of the hub 2 of the rotor; in the embodiment in question, the following means are provided for fixing the housing 10 over the said central part of the hub 2; a yoke 14 is engaged over the hoisting hook 15 of the hub 2 of the rotor and is then fixed to the said hook 15 by means of a pin 16; the intermediate part of the yoke 14 is provided with a threaded rod 17 which can pass freely through a smooth hole in the cover of the housing 10 of cylindrical shape; when the said housing 10 has thus been slipped over the threaded rod 17 on the yoke 14, it can be fixed to the central part of the hub 2 by screwing, for example, a wing nut 18 onto the threaded rod 17 so that the axis of the cylindrical housing 10 coincides with the axis A of the rotor. The two blades 4B (the unfolded position of which is shown as a broken line in FIG. 1) and 4C are then successively folded; to do this, the blade to be folded, for example 4B, is first supported by means of a pole 19, which is optionally provided with a grip 20 of a known type; this is, for example, a grip of the type illustrated in FIG. 5 of and described in French Pat. No. 1,322,839, filed on Dec. 22, 1961 by SUD-AVIATION, SOCIETE NATIONALE DE CONSTRUCTIONS AERONAUTIQUES. With the blade 4B supported in this way, one of its two link shafts, for example 9a, is disengaged and is substituted by a folding shaft 21, which is of approximately the same diameter but of greater length; as can be seen in FIG. 3, means, in particular a pin 23 and an elastic fastener 24, are provided for detachably fixing the lower part of the folding shaft 21 into the socket, integral with the root of the corresponding blade 4B, in which socket the link shaft 9a was previously engaged; furthermore, means, in particular an elastic clamp 25, are provided for detachably fixing the upper part of the folding shaft, such as 21, into a socket 22 which is integral with the end of the corresponding elongate support 11B. As soon as the upper part of the folding shaft 21 has been fixed to the end of the corresponding elongate support 11B, the other link shaft (corresponding to the shaft 9b of the blade 4A in FIG. 2) is removed; by moving the pole 19, which is kept vertical, the operator can then cause the blade 4B to pivot about the folding shaft 21 towards the rear of the helicopter; when the blade 4B has arrived in a position approximately parallel to the longitudinal axis L of the helicopter, as can be seen in FIG. 2, the blade 4B is immobilized, relative to the fuselage, using known means, for example caps and ropes (26 in FIG. 1), which are slightly stretched between the end of the blade 4B and anchoring points provided for this purpose on the fuselage of the helicopter. The operator then releases the grip 20 so as to remove the pole 19 in order to use it again for folding the blade 4C by repeating the procedure described above.

The unfolding of the blades 4B and 4C can take place by means of the reverse operations. Operators working simultaneously can carry out all the folding or unfolding operations within a time of the order of 3 minutes, even in the presence of very strong winds.

In the case of a four-blade rotor, which is illustrated in FIGS. 4 and 5, the rotor is brought, before folding the blades, into a position which is such that the four blades, 4A to 4D, are inclined at forty-five degrees to the longitudinal axis L of the helicopter; the equipment according to the present invention, which is used for permitting the folding of the four blades, must in that case comprise four rigid elongate supports, 11A to 11D, fixed to the cylindrical housing 10. The folding procedure, which is identical to that described above, must be carried out successively for each of the four blades 4A to 4D, so as to bring them into the positions illustrated in FIG. 5, which positions are approximately parallel to the longitudinal axis L of the helicopter. In an optional variant illustrated in FIG. 4, which can be used regardless of the number of blades on the rotor, the ends of the folded blades can remain clamped in the grips 20 of the poles 19, which poles can themselves be fixed, at points such as 27, to the side walls of the helicopter fuselage.

The present invention is not restricted to the embodiments described above; all the variants thereof are also within its scope. The use of a pole with a grip is optional. The housing 10 could also be in the shape of a prism, possessing, in particular, as many side faces as the equipment comprises rigid elongate supports. The articulations of the elongate supports on the housing are optional, it being possible for them to be substituted by rigid links. The equipment according to the present invention can be applied to all rotor hubs of the type indicated, regardless of the construction of the link members between the blade roots and the arms of the hub, provided that these link members comprise at least one shaft, which is approximately perpendicular to the plane of the star and which can preferably be disengaged so that it can be replaced by a suitable folding shaft. The type of the means for fixing the housing to the central part of the hub is optional, as are also the shape and the structure of the rigid elongate supports and the means for fixing them to the upper ends of the folding shafts; in particular in the case where the rigid elongate supports, such as 11B in FIG. 3, are mounted so that they can pivot about a horizontal axis 12B, the upper end of the folding shaft 21 can be permanently fixed to the end of the said elongate support 11B.

The equipment according to the present invention can also be applied to the rotors in which the root of each blade is joined to the end of the corresponding arm of the hub by means of a single link shaft which is approximately perpendicular to the plane of the star, for example as illustrated in FIGS. 1 and 2 of abovementioned U.S. Pat. No. 3,967,918; in this case, however, special provisions must be made in order to prevent the blade from detaching itself from the corresponding arm of the hub during the replacement of the single link shaft by the folding shaft. This latter difficulty could be surmounted, for example, by arranging the single link shaft in such a way that it can act as a folding shaft; to do this, it would suffice to provide it, above the upper branch (5a in FIG. 3) of the yoke, with an extension which is capable of being fixed, by suitable means, to the end of the corresponding, rigid elongate support 11B. Of course, this latter embodiment can also be applied to hubs, to each arm of which the blade root is fixed by means of several link shafts, only one of which must then be arranged so as to act as a folding shaft for the blade, it being necessary for the other shafts to be detachable.

What I claim is:

1. Equipment for folding the blades of a main helicopter rotor, in particular of the type having a star-shaped hub with a rigid central part and provided with arms which are flattened in the plane of the star and flexible perpendicularly to this plane, a blade root being joined to the end of each arm of said hub by means of members having at least one link shaft which is substantially perpendicular to the plane of the star, said equipment essentially comprising
a housing adapted to be fitted over said rigid central part of said hub,
and rigid elongate supports linked by one end to said housing,
and a folding shaft linking the other end of each of said elongate supports to one of said blade roots with the number of supports at most equal in number to the number of blades of the helicopter rotor.

2. Equipment according to claim 1 in which one said link shaft at each said arm of said hub is said folding shaft connecting one of said supports to one of said blade roots.

3. Equipment according to claim 1 in which said folding shaft is a spindle substituted for one of said link shafts connecting one of said supports to one of said blade roots.

4. Equipment according to claim 1 in which said housing is cylinder shaped.

5. Equipment according to claim 1 in which said housing is prism shaped.

6. Equipment according to claim 1 in which articulations are provided on the sidewalls of said housing connecting said elongate supports to said housing with the axes of said articulations being substantially perpendicular to the axis of the rotor.

7. Equipment according to claim 1, which further comprises fastening means for detachably fixing the lower part of each said folding shaft into a socket integral with the root of the corresponding blade.

8. Equipment according to claim 7, in which said fastening means comprises elastic clamps.

9. Equipment according to claim 7, in which said fastening means comprises pins.

10. Equipment according to claim 1, which further comprises fastening means for detachably fixing the upper part of each said folding shaft into a socket integral with the end of said corresponding elongate support.

11. Equipment according to claim 10, in which said fastening means comprise elastic clamps.

12. Equipment according to claim 10, in which said fastening means comprise pins.

13. Process for manually folding the blades of a main helicopter rotor having a hub with a rigid central part comprising the steps of fitting a housing, provided with elongate supports, over the rigid central part of the rotor hub, and then, for each blade which has not stopped above the longitudinal axis of the helicopter, supporting the blade by means of a pole, substituting a folding shaft for one of the link shafts of the blade, fixing the upper part of the said folding shaft to the end of the corresponding elongate support, removing any further link shaft from the blade, causing the blade to pivot about the folding shaft towards the rear of the helicopter, using the said pole, and then, immobilising the blade, relative to the fuselage, using fastening means, in a position in which the folded blade is substantially parallel to the said longitudinal axis.

14. Process for manually folding the blades of a main helicopter rotor having a hub with a rigid central part comprising the steps of fitting a housing, provided with elongate supports, over the rigid central part of the rotor hub, and then, for each blade which has not stopped above the longitudinal axis of the helicopter, fixing the upper part of a link shaft acting as a folding shaft to the end of the corresponding elongate support, removing any further link shaft from the blade, causing the blade to pivot about the folding shaft towards the rear of the helicopter, using a pole, and then immobilizing the blade, relative to the fuselage, using fastening means, in a position in which the folded blade is substantially parallel to the said longitudinal axis.

15. The process of claim 14 wherein said fastening means is said pole.

* * * * *